(12) United States Patent
Zimhoni et al.

(10) Patent No.: US 7,568,307 B1
(45) Date of Patent: Aug. 4, 2009

(54) GREENHOUSE STRUCTURE

(75) Inventors: Erez Zimhoni, Kfar Hes (IL); Amir Halachmi, Kfar Yehoshua (IL); Zohar Ziv, Alumim (IL); Erez Nahum Trodel, Kibbutz Shefayim (IL)

(73) Assignee: Netafim, Ltd., Tel Aviv (IL)

( * ) Notice: Subject to any disclaimer, the term of this patent is extended or adjusted under 35 U.S.C. 154(b) by 12 days.

(21) Appl. No.: 12/017,638

(22) Filed: Jan. 22, 2008

(51) Int. Cl.
*A01G 9/14* (2006.01)
(52) U.S. Cl. ........................................................ 47/17
(58) Field of Classification Search ............... 47/17, 47/29.5; 52/199, 66, 69, 302.1; 454/358, 454/339, 364, 250, 365; 119/436
See application file for complete search history.

(56) References Cited

U.S. PATENT DOCUMENTS

| | | | | | |
|---|---|---|---|---|---|
| 1,689,131 | A | * | 10/1928 | Goodwin | 52/1 |
| 1,903,510 | A | * | 4/1933 | Laboon et al. | 159/1.1 |
| 4,815,365 | A | * | 3/1989 | Dupont | 454/254 |
| 4,955,287 | A | * | 9/1990 | Dupont | 454/358 |
| 5,000,080 | A | * | 3/1991 | Holmberg | 454/250 |
| 5,655,335 | A | * | 8/1997 | Vermeer | 52/66 |
| 7,074,124 | B2 | | 7/2006 | Williams | |

FOREIGN PATENT DOCUMENTS

| | | | |
|---|---|---|---|
| GB | 2076143 | * | 11/1981 |
| JP | 59-66631 | * | 4/1984 |
| JP | 2-279847 | * | 11/1990 |
| WO | WO 2006045133 A1 | | 5/2006 |

* cited by examiner

*Primary Examiner*—T. Nguyen
(74) *Attorney, Agent, or Firm*—Womble Carlyle

(57) ABSTRACT

A greenhouse structure has first and second sections. The second section includes moveable and fixed supports and a flexible material retained therebetween. The first section is adapted to bias the moveable support from an initial position to a final position in which at least a portion of the moveable support is more distant from the fixed support. In the final position, the flexible material is tauter than in the initial position.

16 Claims, 3 Drawing Sheets

GREENHOUSE STRUCTURE

BACKGROUND

The present disclosure relates to greenhouse structures and in particular to greenhouse structures that retain thereupon flexible material.

In such greenhouses, portions of the structure may be operated to open and close in order to provide for example ventilation. U.S. Pat. No. 7,074,124, the disclosure of which is incorporated herein by reference, describes a greenhouse with plastic film that forms part of the roof and an opening that is formed in the roof. A flap that covers the opening may be moved from a closed position to an open position by a rack and pinion.

Published International Patent Application No. WO 2006/045133, the disclosure of which is incorporated herein by reference, relates to a greenhouse comprising a supporting frame structure with a gable-shaped roof. The structure is provided with a roof section that may be displaced to open an air outlet. A flexible roofing sheet is located on the remaining roof adjacent the roof section.

SUMMARY

The following embodiment and aspects thereof are described and illustrated in conjunction with systems, tools and methods which are meant to be exemplary and illustrative, not limiting in scope.

In an embodiment of the present disclosure is provided a greenhouse structure comprising a first section and a second section, the second section comprising a moveable support and a fixed support, the moveable support being adapted to move between an initial position and a final position, at least a portion of the moveable support having a distance from the fixed support that is smaller in the initial position than in the final position, wherein the first section is adapted to bias the moveable support to the final position.

In some embodiments, the first section bears against the moveable support to bias it to the final position.

In some embodiments, the second section comprises a flexible material being retained between the fixed and moveable supports and in the final position the material is tauter than in the initial position.

In some embodiments, the moveable support is adapted to be fixed in the final position.

In some embodiments, the first section is adapted to move along a path that passes through the moveable support.

In some embodiments, the first section bears against the moveable support to bias the moveable support towards the final position.

In some embodiments, the greenhouse comprises an opening and the first section is adapted to cover or uncover the opening and thereby affect ventilation in the greenhouse.

In some embodiments, the greenhouse comprises a means adapted to move the first section.

In some embodiments, the means is a rack and pinion.

In some embodiments, the tautness of the flexible material is mainly exhibited along an axis and at least one of the supports comprise a side face generally perpendicular to the axis, the side face comprising a dent projecting along the axis.

In some embodiments, the moveable support comprises a gasket having a solid internal foamed body, and at least in the final position of the moveable support the first section is adapted to bear against the gasket when covering the opening.

In an embodiment of the present disclosure is also provided a method for tautly retaining a flexible material on a greenhouse structure comprising the steps of: providing a greenhouse structure comprising a first section and a second section, a flexible material being laid upon the second section, moving the first section and thereby biasing the flexible material to increase its tautness on the second section.

In some embodiments, the first section bears against the second section to thereby bias the flexible material to increase its tautness.

In some embodiments, the second section comprises a fixed support and a moveable support, the flexible material being retained between the fixed and moveable supports, and the first section bears against the moveable support to thereby bias the flexible material to increase its tautness.

In some embodiments, the moveable support is adapted to move between an initial position and a final position, a distance between the moveable and fixed supports being larger in the final position then in the initial position, and the first section being adapted to bias the moveable support towards the final position.

In addition to the exemplary aspects and embodiment described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The disclosure, however, both as to organization and method of operation, together with objects, features, and advantages thereof, may best be understood by reference to the following detailed description when read with the accompanying figures, in which.

Figure 1:
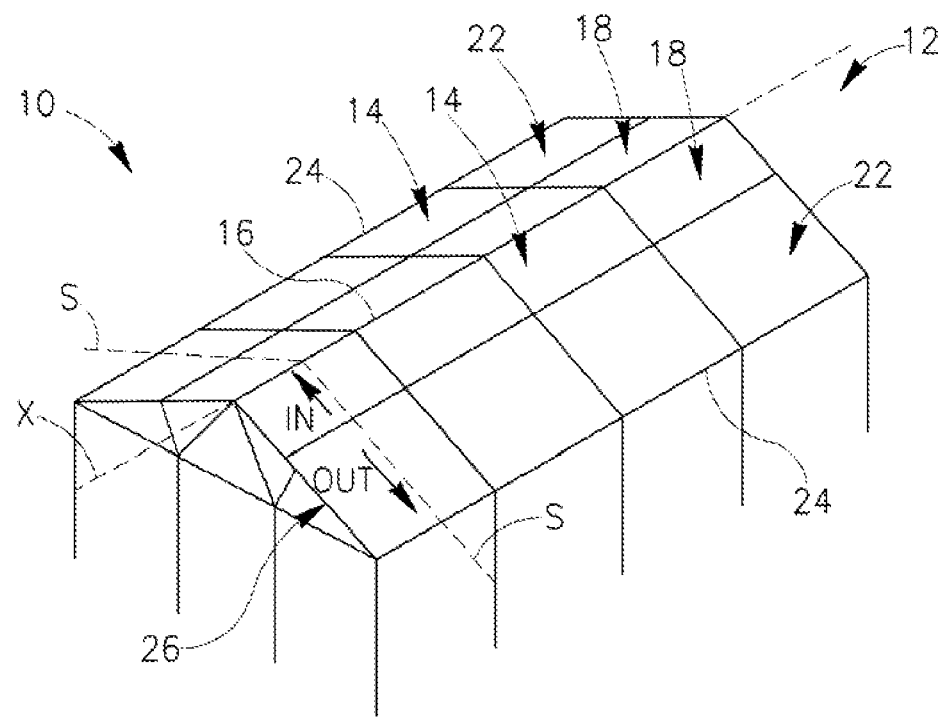
FIG. 1 shows a perspective top view of a greenhouse in accordance with the present disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 2:
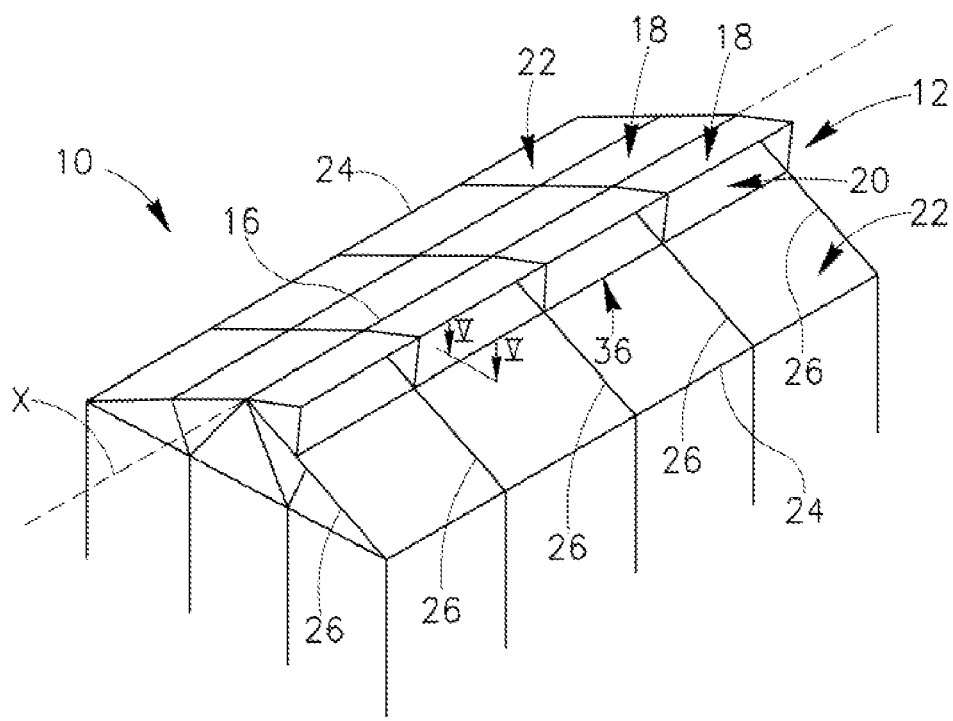
FIG. 2 shows the perspective top view of the greenhouse with an open flap.

Attention is first drawn to FIGS. 1 and 2. A greenhouse structure 10 having a gabled shaped roof 12 with two slopes 14 has a covering material that is retained thereupon. A roof axis X at an apex of the roof 12 extends along a ridge 16 at an intersection of the slopes 14 and in each slope 14 a first section 18 of the roof 12 is located adjacent the ridge 16. The first section 18 is preferably in the form of a flap that forms part of a ventilation system that is adapted to uncover openings 20 in the roof 12. A second section 22 of the roof 12 is located in each slope 14 adjacent the first section 18.

A slope axis 8, perpendicular to the roof axis X, is located in each slope 14 and defines opposing inner and outer directions respectively towards the ridge 16 and away from the ridge 16. It should be noted that directional terms appearing throughout the specification and claims, e.g., "in", "out", "up", "down" etc. (and derivatives thereof) are for illustrative purposes only, and are not intended to limit the scope of the appended claims. In addition it is noted that the directional terms "down", "below" and "lower" (and derivatives thereof) define identical directions.

Figure 3:
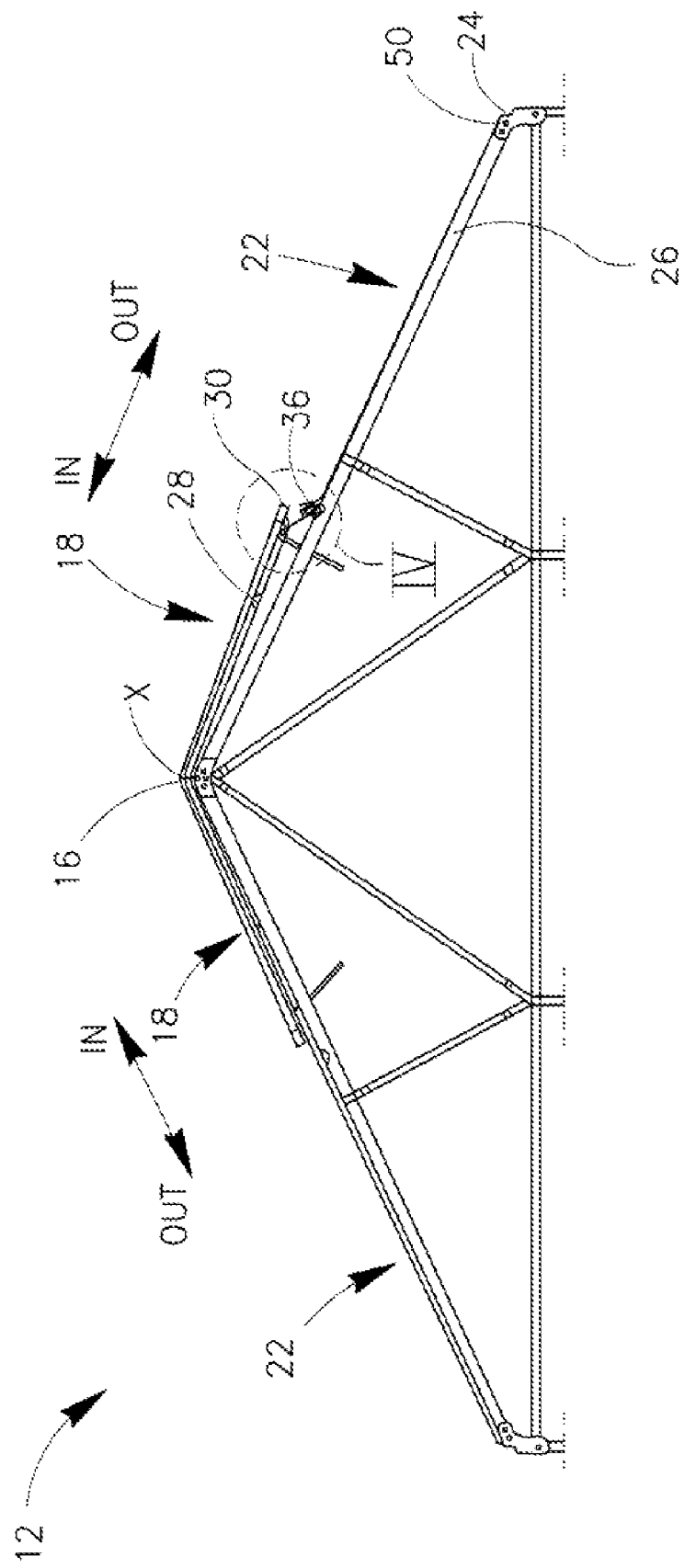
FIG. 3 shows a front view of a roof of the greenhouse.
Figure 4A:
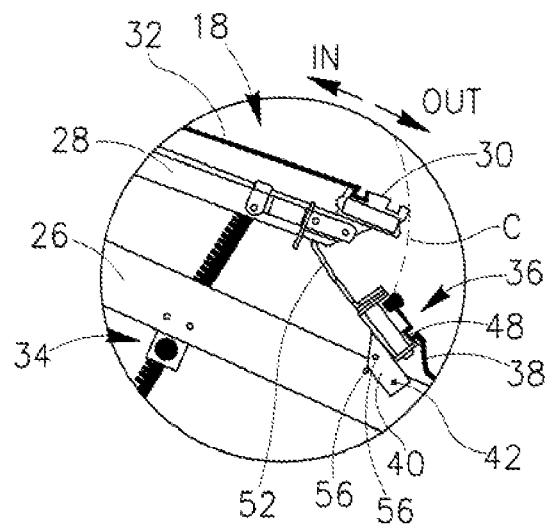
FIG. 4A shows a section of FIG. 3 showing a second section of the roof in an initial position.
Figure 4B:
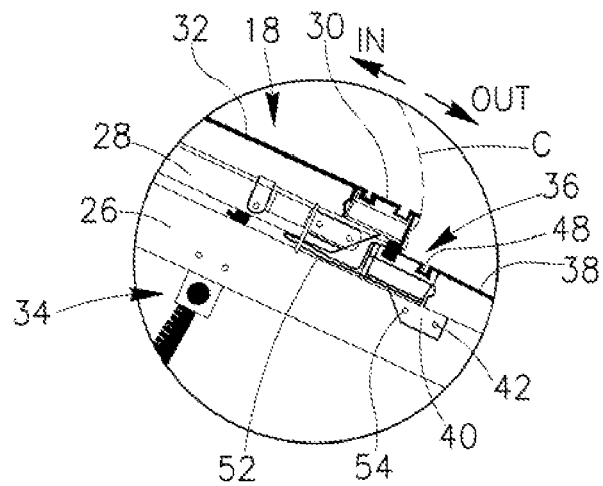
FIG. 4B shows a section of FIG. 3 showing the second section of the roof in a final position.

Attention is additionally drawn in FIGS. 3, 4A and 4B. The greenhouse 10 has support type beams and rafter type beams at the roof 12. Support type beams are referred to herein as beams that extend parallel to the roof axis X and rafter type beams are referred to herein as beams that extend parallel to the slope axis S. It is noted that the terms rafter and support, when used hereinbelow in association with roof elements, determine the orientation of said elements in relation to the roof and slope axes X, S.

Two eave supports 24 located at the eaves of the roof 12 are optionally in the form of gutters or optionally have each a structure that may support a gutter (gutters not shown). Several main rafters 26 extend from each eave support 24 to the ridge 16 which may also be referred to as a ridge support. Each flap 18 has minor rafters 28 that extend from the ridge 16 to a flap support 30 to form a frame. A material 32 of the flap is laid upon the frame. Optionally the material of the flap 32 is a flexible material that is tautly retained between the ridge and flap supports 16, 30, respectively.

A rack and pinion mechanism 34 on each main rafter 26 is powered by a driving means (not shown) to bias each flap 18 to rotate about the axis X. Each flap 18 may be biased to uncover (open) or cover (close) an opening 20 in the roof 12. An imaginary curve C includes the path that an outer end of each flap 18 traverses as it rotates about the axis X.

The second section 22 extends inwards from the eave support 24 to a moveable support 36 thereof and has a flexible material 38 that is retained thereupon. The moveable support 36 has brackets 40 that are associated each with a respective main rafter 26. Each bracket 40 is connected on the one hand to the moveable support 36 and on the other hand to its respective main rafter 26 at a hinge 42. The brackets 40 enable the moveable support 36 to rotate about the hinges 42 between a final position and an initial position. In the final position the moveable support 36 is adjacent the main rafters 26. In the initial position the moveable support 36 is distant of the main rafters 26 and more outward in relative to the final position.

Figure 5:
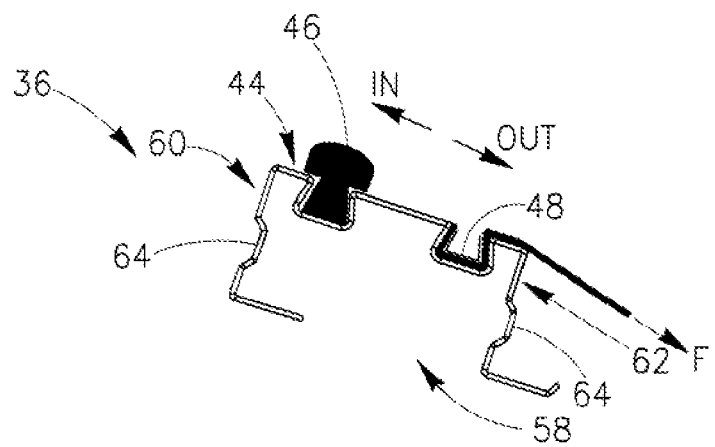
FIG. 5 shows a cross sectional view taken in the plane V-V shown in FIG. 2.

Attention is additionally drawn to FIG. 5. The moveable support 36 has an upper face 44 that faces out of the greenhouse 10. A gasket 46 and a holder 48 of the moveable support 36 are located at the upper face 44. The gasket 36 is retained in the upper face 44 and projects above the upper face 44. Preferably the gasket 46 is an elastomer with an internal solid body that is preferably foamed. The gasket 346 being internally solid is easy and cheap to produce and the foaming increases the elasticity of the gasket 46 that is preferable for the gasket's sealing functionality that will be mentioned hereinbelow.

The holder 48, which will be referred to herein as a moveable holder 48, retains an inner end of the flexible material 38 while the outer end of the flexible material 38 is retained at a fixed holder 50 (See FIG. 3) that is optionally on the eave support 24. Optionally, the moveable support 36 has bulges 52 that project inwardly therefrom and are located each along the moveable support 36 adjacent the main rafters 26. It is noted that the flexible material 38 may be in the form of a net or a plastic sheet such as a plastic sheet that includes a polyolefin. In addition it is noted that the curve C passes through at least a portion of the moveable support 36 thereby positioning the at least a portion inward in relation to the curve C. This ensures that at least a portion of the moveable support 36 is in the path of the flap 18 and thereby the flap 18 will meet and bias the moveable support 36 towards the final position as it rotates about the axis X to close.

In the initial position of the moveable support 36 (FIG. 4A), the moveable holder 48 is at a distance Di from the fixed holder 50. In the final position of the moveable support 36 (FIG. 4B); the moveable holder 48 is at a distance Df from the fixed holder 50 that is larger than the distance Di. As a result, in the final position the flexible material 38 has a tautness that is higher than in the initial position.

To tautly retain flexible material 38 upon the second section 22 the following steps are optionally taken. The flap 18 of a given slope 14 is first placed in an open position above the given slope 14. With the moveable support 36 placed in its initial position, the flexible material 38 is firmly attached at both ends to the fixed and moveable holders 50, 48, respectively. When biasing the moveable support 36 from the initial position to the final position, the flap 18 is operatively engaged to the moveable support 36 via the bulges 52. By urging the flap 18 to close, using the rack and pinion mechanisms 34, the minor rafters 28 of the flap 18 reach a position where they bear against the bulges 52 and thereby bias the movable support 36 to rotate about the hinges 42 and pivot relative to the main rafter 26, towards the final position. This results in an increase of distance between the moveable and fixed holders 48, 50 and thereby an increase in the tautness of the flexible material that is retained therebetween. At this final position of the moveable support 36, a fixing means 54 may be placed through apertures 56 in each bracket 40 and its associated main rafter 26 to fix the moveable support 36 in its final position.

It is noted that once the moveable support 36 has been fixed in its final position, the functionality of the flap 18 as a means that urges the flexible material 38 to be tauter on the second section 22 is temporarily terminated and the flap 18 returns to function as part of a ventilation system that is adapted to freely open and close.

The ventilation system is adapted to allow air to enter and/or exit the interior of the greenhouse 10 when the flaps 18 are open. When it is required to isolate the interior of the greenhouse from the environment, the flaps optionally close. To ensure optimal sealing, in an embodiment of the disclosure the flap supports 30 bear against the gasket 46 of the moveable support 36 when the flap 18 is in its closed position.

Each support 16, 24, 30, 36 optionally has an internal cavity 58 that extends parallel to the ridge axis X. This cavity 58 is, inter alia, bound by inner and outer side faces 60, 62 that extend down from the upper face 44 and generally face inwards and outwards, respectively. The flexible material 38 when held in a taut state between two supports imposes forces F upon the supports generally along the slope axis 8 which may bias the supports to deform along the axis S. The extend of this deformation may be largest at a mid location along the supports between two rafters.

In an embodiment of the disclosure, the side faces 60, 62 of the support are provided with dents 64 that project out of the sides faces 60, 62 generally along the slope axis S. These dents 64 increase the moment of inertia of the supports and thereby increase their resistance to bending about an axis perpendicular to the slope axis S. As a result, decreased deformation of the supports due to forces F imposed thereupon by the flexible material 38 is exhibited in supports incorporating dents 64 in their side faces 60, 62.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although the present embodiment has been described to a certain degree of particularity, it should be understood that various alterations and modifications could be made without departing from the scope of the disclosure as hereinafter claimed.

What is claimed is:

1. A greenhouse structure comprising a first section and a second section,
   the second section comprising a moveable support and a fixed support, the moveable support being adapted to move between an initial position and a final position, at least a portion of the moveable support having a distance from the fixed support that is smaller in the initial position than in the final position, wherein
   the first section is adapted to bias the moveable support to the final position.

2. The greenhouse structure according to claim 1, wherein the first section bears against the moveable support to bias the moveable support towards the final position.

3. The greenhouse structure according to claim 1, wherein:
   the second section comprises a flexible material retained between the fixed and moveable supports; and
   in the final position, the flexible material is tauter than in the initial position.

4. The greenhouse structure according to claim 3, wherein tautness of the flexible material is mainly exhibited along an axis and at least one of the supports comprises a side face generally perpendicular to the axis, the side face comprising a dent projecting out of the side face along the axis.

5. The greenhouse structure according to claim 1, wherein the moveable support is adapted to be fixed in the final position.

6. The greenhouse structure according to claim 1, wherein the first section is adapted to move along a path that passes through the moveable support.

7. The greenhouse structure according to claim 1, comprising an opening and the first section is adapted to cover or uncover the opening and thereby affect ventilation in the greenhouse.

8. The greenhouse structure according to claim 7, comprising a means adapted to move the first section.

9. The greenhouse structure according to claim 8, wherein the means adapted to move the first section comprises a rack and pinion.

10. The greenhouse structure according to claim 7, wherein:
    the moveable support comprises a gasket having a solid internal foamed body; and
    at least in the final position of the moveable support, the first section is adapted to bear against the gasket when covering the opening.

11. A greenhouse roof structure comprising:
    a ridge extending along a roof axis;
    at least one eave;
    a first section and a second section located between the ridge and the cave, with the first section closer to the ridge than the second section; wherein:
    the second section comprises a moveable support and a fixed support, the moveable support being adapted to move between an initial position and a final position, at least a portion of the moveable support having a distance from the fixed support that is smaller in the initial position than in the final position; and
    the first section is configured to bias the moveable support from the initial position to the final position.

12. The greenhouse roof structure according to claim 11, wherein:
    the moveable support comprises at least one bulge which is operatively engaged by the first section, when the second section is biased by the first section.

13. The greenhouse roof structure according to claim 11, wherein:
    the moveable support is hingedly connected to a rafter; and
    the moveable support is configured to pivot relative to said rafter, when the second section is biased by the first section.

14. The greenhouse roof structure according to claim 11, wherein:
    the moveable support comprise a gasket having a solid internal foamed body; and
    in the final position, the first section bears against the gasket.

15. The greenhouse roof structure according to claim 11, wherein:
    the second section comprises a flexible material retained between the fixed and moveable supports; and in the final position, the flexible material is tauter than in the initial position.

16. The greenhouse roof structure according to claim 11, wherein:
    the moveable support comprises at least one bulge which is operatively engaged by the first section, when the second section is biased by the first section;
    the moveable support is hingedly connected to a rafter and is configured to pivot relative to said rafter, as the second section is biased by the first section;
    the moveable support comprises a gasket having a solid internal foamed body, and in the final position the first section bears against the gasket; and
    the second section comprises a flexible material retained between the fixed and moveable supports, and in the final position the flexible material is tauter than in the initial position.

* * * * *